(12) United States Patent
Ranta

(10) Patent No.: US 6,356,739 B1
(45) Date of Patent: Mar. 12, 2002

(54) MEASUREMENT METHOD

(75) Inventor: Jukka Ranta, Salo (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/337,290

(22) Filed: Jun. 21, 1999

(30) Foreign Application Priority Data

Jun. 22, 1998 (FI) .................................................. 981431

(51) Int. Cl.[7] .............................................. H04B 17/00
(52) U.S. Cl. ........................ 455/67.1; 455/437; 455/440
(58) Field of Search ................................ 455/425, 436, 455/437, 456, 67.1, 226.1, 226.2, 423, 424, 226.3, 440

(56) References Cited

U.S. PATENT DOCUMENTS

| | | | |
|---|---|---|---|
| 5,128,925 A | | 7/1992 | Dornstetter et al. .......... 370/17 |
| 5,293,645 A | * | 3/1994 | Sood .......................... 455/456 |
| 5,390,339 A | * | 2/1995 | Bruckert et al. ............. 455/437 |
| 5,423,067 A | | 6/1995 | Manabe ...................... 455/56.1 |
| 5,581,579 A | | 12/1996 | Lin et al. .................... 375/331 |
| 5,799,255 A | | 8/1998 | Berg et al. .................. 455/551 |
| 6,108,553 A | * | 8/2000 | Silventoinen et al. ....... 455/456 |

FOREIGN PATENT DOCUMENTS

| | | |
|---|---|---|
| EP | 0 341 738 A3 | 11/1989 |
| EP | 0767594 A2 | 9/1997 |
| EP | 0848508 A2 | 6/1998 |
| FI | 101445 B | 4/1997 |
| GB | 2 298 551 A | 9/1996 |
| SE | 470 079 | 11/1993 |
| WO | WO 91/05415 | 4/1991 |
| WO | WO 92/06543 | 4/1992 |

OTHER PUBLICATIONS

Patent Abstracts of Japan JP 10013329 A.
Finnish Search Report.
ETS 300 912, Nov. 97 "Digital cellular telecommunications system (Phase 2+); Radio subsystem synchronization" (GSM 05.10 version 5.2.0) Part A: Release 96 and Release 97.

* cited by examiner

Primary Examiner—Nay Maung
Assistant Examiner—Quochien B. Vuong
(74) Attorney, Agent, or Firm—Perman & Green, LLP

(57) ABSTRACT

The invention relates to internal measurement methods of mobile communication systems, more particularly how to arrange time intended for signal measurement for the mobile stations. In the method according to the invention the RSSI and OTD measurements are made from the same data collected during a certain period of time, whereby the same measurement data in a way is used two times in order to generate two different sets of measurement results. This saves the free time available during one frame, because it is not necessary to arrange separate measurement periods for the RSSI and the OTD measurements.

7 Claims, 4 Drawing Sheets

MEASUREMENT METHOD

OBJECT OF THE INVENTION

The invention relates to internal measurement methods of mobile communication systems, particularly to measurements of signals from adjacent base stations. The invention relates further to a measurement method according to the first claim.

DESCRIPTION OF THE TECHNICAL BACKGROUND

A terminal of a cellular system tries to select a certain base station, within whose coverage area, i.e. cell, it operates. Among other things the cell selection is based on the measurement of the received signal strength (RSSI, Received Signal Strength Indicator) both in the terminal and in the base station. For instance in the GSM system (Global System for Mobile telecommunications) each base station transmits a signal on a certain so called BCCH channel (Broadcast Control CHannel), whereby the terminals measure the strengths of the BCCH signals received by them and conclude on the basis of these signal strengths which cell is the most favourable regarding the radio connection quality. The base stations also transmit to the terminals information about the BCCH frequencies used in the adjacent cells so that the terminals know which frequencies they must monitor in order to find the BCCH transmissions of the adjacent cells.

Regarding the detection of base stations a GSM cellular network at present operates in the following way. For each cell of the GSM network there is defined a list of neighbouring cells which contains the broadcast control channel (BCCH) frequencies of those base stations to which a terminal can next move from the current cell. The mobile station measures the field strengths at the broadcasting channel (BCCH) frequencies of those base stations defined by the list of neighbouring cells, forms the average for each and on the basis of the results it generates a list of the six strongest neighbouring base stations. The aim is to decode the identity codes of the six strongest received neighbours, and a report to the network is made about the levels and identity codes of those base stations for which the identity codes were decoded. The information is used by the network for decisions about change of base station providing service (handover).

In addition to the RSSI measurements the mobile stations measure base station signals also for other purposes, such as in order to determine the time differences of the base station signals. Such time difference measurements (OTD, Observed Time Difference) are used among other things during handover preparation and particularly for mobile station positioning. Essentially OTD means the timing difference between the current serving base station and another base station, as observed by the mobile station. OTD is defined in the ETSI standard ETS 300 912, November 1997, appendix A.1, where the generation of the OTD value is described in more detail.

One method used in mobile communication systems for positioning is the positioning method based on the propagation time of the radio transmission. Positioning based on the propagation time can be made on the basis of the mobile communication network, whereby at least three base stations transmit a radio signal to a mobile station which examines the arrival time differences (OTD, Observed Time Difference) of the signals, or on the basis of the mobile station, whereby the mobile station transmits a radio signal to at least three base stations (BTS, Base Transceiver Station), which examine the observed time difference of arrival (TDOA). On the basis of the arrival times a location service centre (LSC) can obtain at least two hyperbolas, at the intersection of which the mobile station is located. Due to the inaccuracies of the arrival times the hyperbolas are widened to be broad bands having an intersection which defines an area and not a certain point. The positions of the hyperbolas are defined by the positions of the base stations.

The positioning of a mobile station on the basis of OTD measurements requires much time for the measurement. The more accurate measurement result is desired the more time has to be spent for the measurement. In addition to this the RSSI measurements consume available free measurement time. Thus the problem is to obtain sufficiently measurement time for both the RSSI measurements and the OTD measurements. One solution is to use more than one receiver section in the mobile station, but in practice a solution of this type is too expensive. Therefore we discuss below an economically feasible solution where the mobile station has only one receiver section.

The FIGS. 1a to 1d illustrate the prior art situation regarding the RSSI and OTD measurements. FIG. 1a illustrates a common situation where the mobile station communicates with the network using one time slot for transmission TX and one time slot for reception RX. In such a situation the mobile station has good chances to do the RSSI measurements, which in FIG. 1a is illustrated by the rectangle M.

FIG. 1b illustrates a situation where the mobile station in addition to the RSSI measurements also performs OTD measurements. As is seen in FIG. 1b there is still time for this during one frame, but the amount of free time is already clearly smaller than in the situation of FIG. 1a.

In FIG. 1b and in the other figure the OTD measurement is presented as a measurement with the duration of about 1.5 time slots. For the OTD measurement there is typically used a period which is not quite that long. However, the timing of the OTD measurement is very critical. Even if the measurement would not require the whole period of 1.5 time slots the measurement can be made anywhere during said period. Therefore a period of this length must be reserved for OTD measurements in a TDMA frame.

FIG. 1c shows a situation where a mobile station transmits during two time slots and receives during two time slots. Such a utilisation of multiple time slots is possible for instance according to the HSCSD (High Speed Circuit Switched Data) system which is being developed for the GSM system. There is now less free time because in this case already half of the time slots in a frame are used. However, according to FIG. 1c there is still room for the RSSI measurements.

FIG. 1d illustrates a situation where the mobile station performs OTD measurements in addition to the operations of FIG. 1c. In such a situation the free time of a frame is already consumed, and there are scarcely possibilities for extending the OTD measurements. It is also impossible to make the period between different operations arbitrarily short, such as the period between the end of transmission and the start of OTD measurements, because during said period the mobile station's synthesiser must be able to switch frequency from the frequency of the previous operation to the frequency of the next operation. This problem can be relieved by using more than one frequency synthesiser, for instance one frequency synthesiser for each operation, whereby the switching of the operating frequency would simply require that the frequency synthesiser output to be used is selected by a switch means. However, a solution of this kind makes the mobile station's structure more complex and increases the manufacturing costs of the mobile station.

BRIEF DESCRIPTION OF THE INVENTION

The object of the invention is to reduce the disadvantages of prior art. One object of the invention is also to realise a method for performing RSSI and OTD measurements which leaves more free time in a frame than prior art techniques.

These objects are attained by collecting measurement data at a suitable point during a frame and by performing both RSSI and OTD measurements from the same collected measurement data.

The method according to the invention is characterised in what is presented in the characterising clause of the independent method claim. A mobile station according to the invention is characterised in what is presented in the characterising clause of the claim concerning a mobile station. Other preferred embodiments of the invention are presented in the dependent claims.

In the method according to the invention the RSSI and OTD measurements are made from the same data collected during a certain period of time, whereby the same measurement data is in a way used two times to generate two different sets of measurement results. This saves free time available during a frame, because it is not necessary to provide separate measurement periods for the RSSI and OTD measurements.

BRIEF DESCRIPTION OF THE FIGURES

The invention is described in more detail below with reference to advantageous embodiments presented as examples and to the enclosed figures, in which.

The same reference numerals and denominations are used for corresponding, parts in the figures. The FIGS. 1a to 1d were described above in connection with prior art.

DETAILED DESCRIPTION OF THE PREFERRED EMBODIMENTS OF THE INVENTION

Figure 1A:
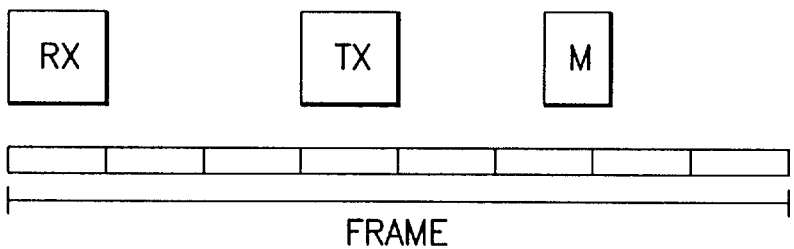
FIGS. 1a to 1d illustrate the timings of prior art RSSI and OTD measurement periods in different situations.
Figure 1B:
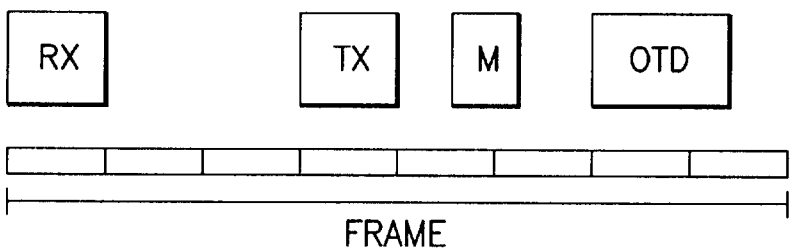
Figure 1C:
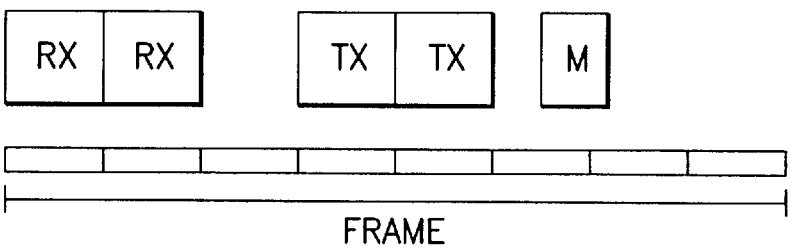
Figure 1D:
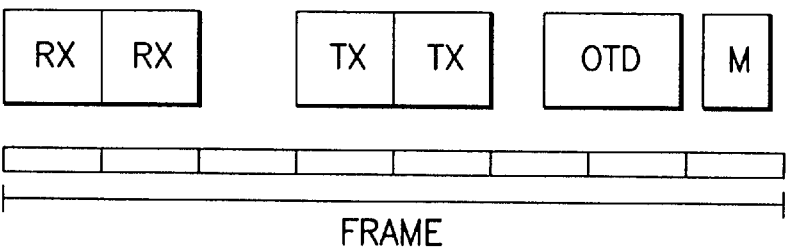
Figure 2A:
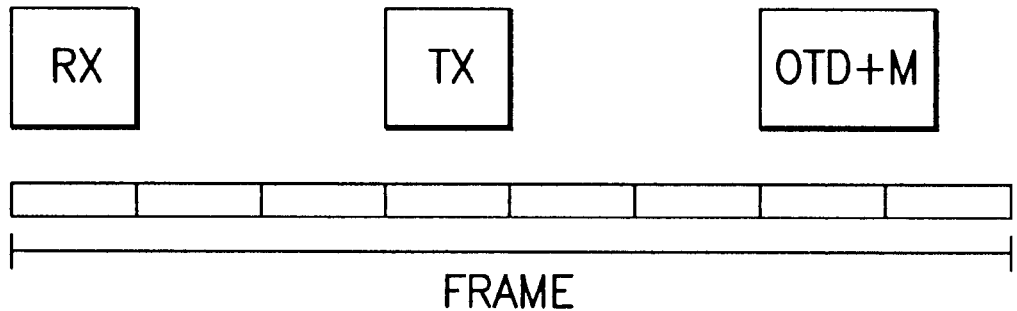
FIGS. 2a to 2b illustrate the timings of the measurement periods of the method according to a preferred embodiment of the invention.
Figure 2B:
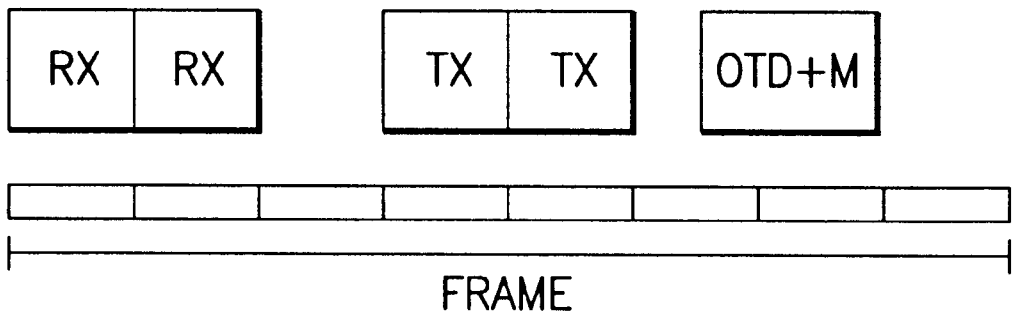

FIGS. 2a and 2b illustrate how the method according to the invention utilises the time during one frame. FIG. 2a illustrates a situation where the mobile station uses one time slot for transmission TX and one for reception RX, and FIG. 2b illustrates a situation where the mobile station uses two time slots for transmission and two for reception. The measurement data for the RSSI and OTD measurements is collected during the period of time represented by the rectangle OTD+M. As is seen in the FIGS. 2a and 2b the use of the common measurement data according to the invention leaves substantially more free time in one frame than the solutions according to the prior art. This facilitates the use of simpler structural solutions because there is ample time available for changes between different operating states. On the other hand, the solution according to the invention enables the use of more than four time slots for communication also when OTD measurements have to be made.

Figure 3:
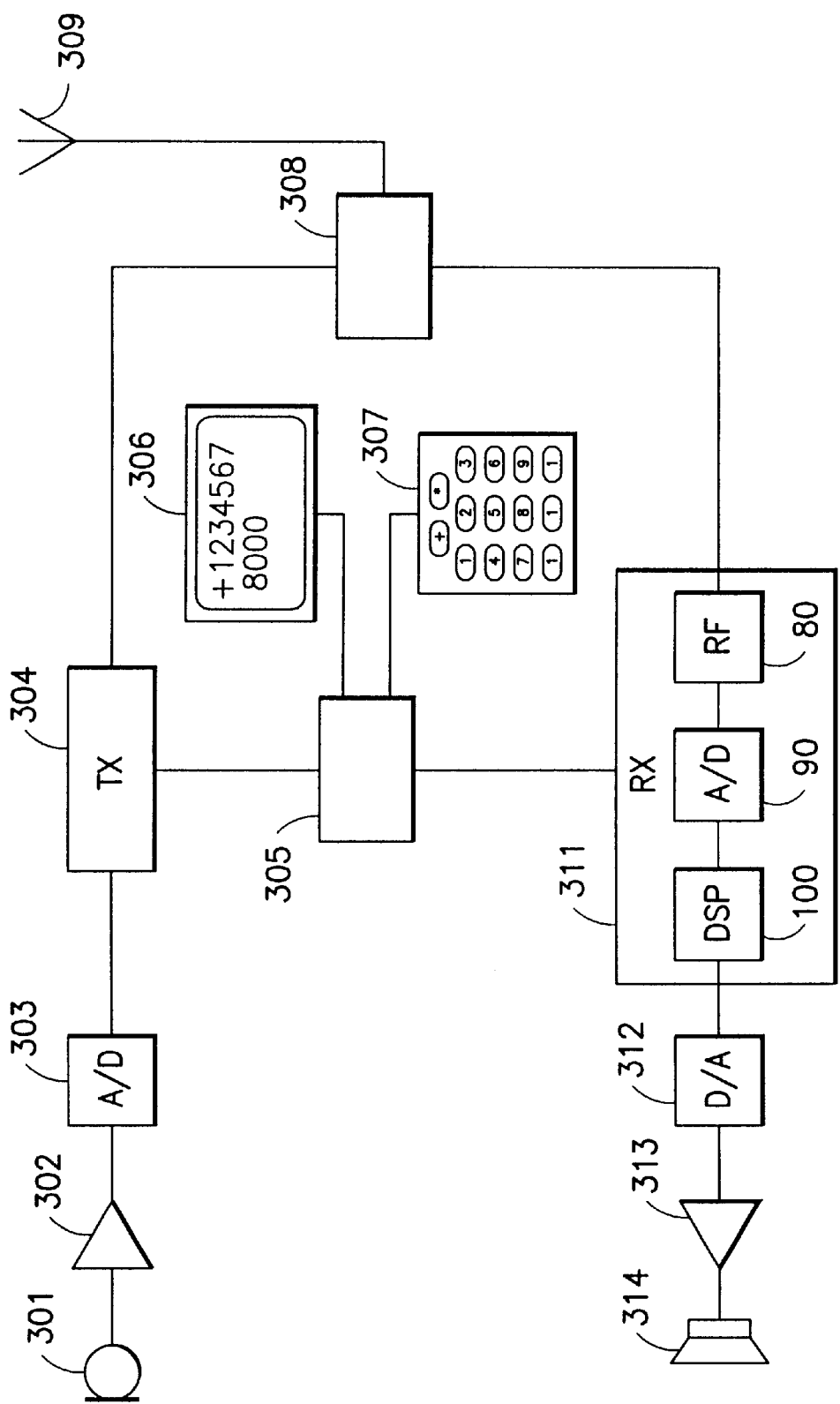
FIG. 3 illustrates the structure of a mobile station according to a preferred embodiment of the invention.

FIG. 3 shows a block diagram of a mobile station according to an exemplary embodiment of the invention. The mobile station comprises components which are typical for the device, such as a microphone 301, a keypad 307, a display 306, an earpiece 314, a transmission/reception switch 308, an antenna 309 and a control unit 305. The figure shows further the transmission and receiver blocks 304, 311 which are typical for a mobile station. The transmission block 304 comprises the functions which are required for speech encoding, channel encoding, encryption and modulation as well as the RF functions. The receiver block 311 comprises the corresponding RF functions and the functions which are required for demodulation, decryption, channel decoding and speech decoding. A signal from the microphone 301, which is amplified in the amplifier stage 302 and converted into a digital form in the A/D converter 303, is supplied to the transmitter block 304, typically to a speech encoding means incorporated in the transmitter block. The transmission signal, which is processed, modulated and amplified in the transmitter block, is supplied via the transmission/reception switch 308 to the antenna 309. The received signal is directed from the antenna via the transmission/reception switch 308 to the receiver block 311, which demodulates the received signal and performs the decryption and channel decoding. The speech signal obtained as the final result is supplied via the D/A converter 312 to the amplifier 313 and further to the earpiece 314. The control unit 305 controls the operation of the mobile station, reads instructions entered by the user via the keypad 307, and displays messages to the user via the display 306.

The receiver block 311 comprises typically an RF section 80, which comprises the analogue high frequency parts of the receiver branch, such as amplifier stages and a mixer. Typically the RF section amplifies the received high frequency signal and downconverts it into an intermediate frequency signal or directly into a baseband signal. The signal generated by the RF section 80 is supplied to the A/D converter 90 which converts the intermediate frequency signal into a digital form, i.e. into a sequence of digital samples. The intermediate frequency signal which is converted to the digital form is supplied to the DSP block 100, which among other things performs the demodulation as well as the decryption and the channel decoding. According to a preferred embodiment of the invention the DSP block 100 also collects the samples generated by the A/D converter 90 during the RSSI and OTD measurement period, and generates the RSSI and OTD measurement results on the basis of the same collected data.

Figure 4:
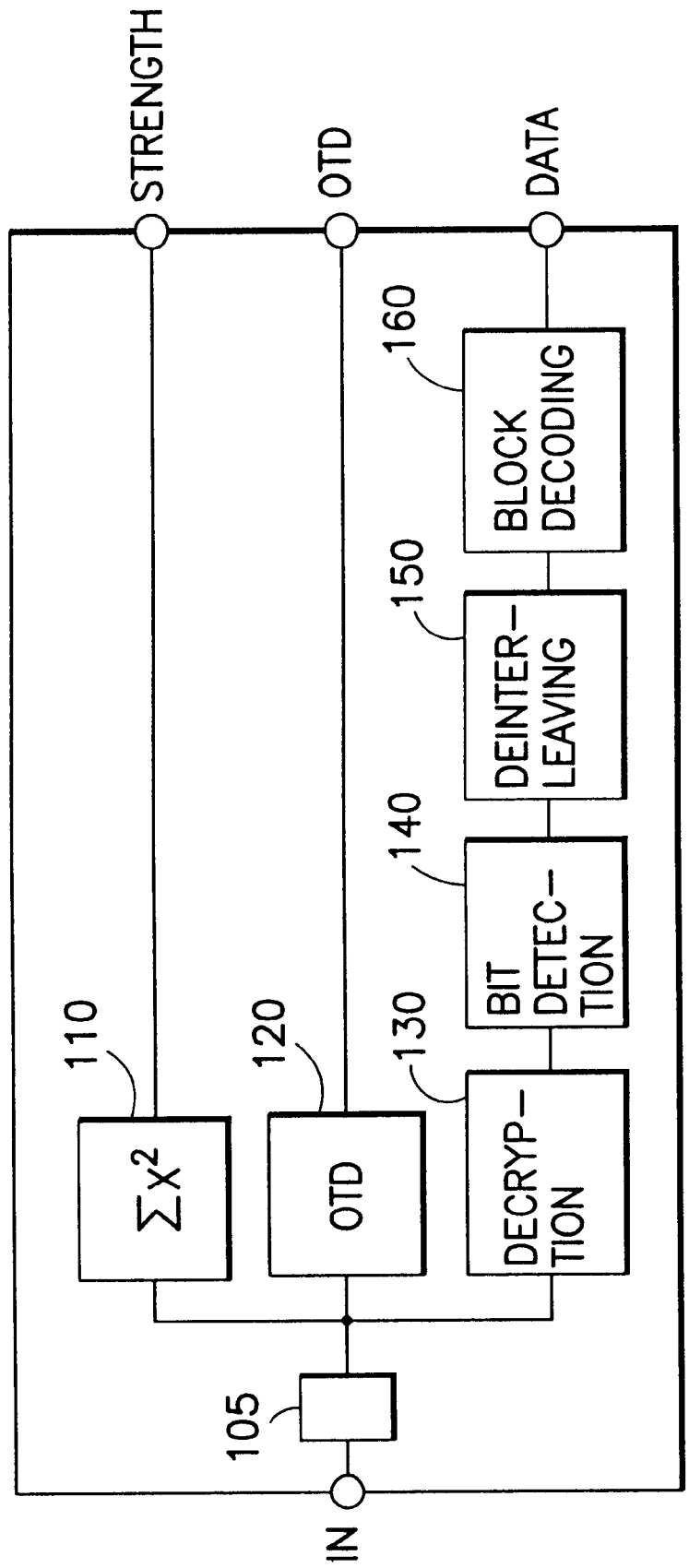
FIG. 4 illustrates in more detail the structure of the DSP block of a mobile station according to a preferred embodiment of the invention.

The structure of the DSP block 100 shown in FIG. 3 is illustrated in more detail in FIG. 4 according to an advantageous implementation of the invention. According to this embodiment the DSP block 100 comprises a buffer 105, which collects in its memory digital data generated by the A/D converter 90. Further the DSP block comprises a signal strength calculation block 110, which from the data stored in the buffer 105 generates the required signal strength measurement results, such as the RSSI values, and an OTD calculation block 120, which from the data stored in the buffer 105 generates the OTD measurement results. In this embodiment the DSP block 100 further comprises some conventional functional blocks of a mobile station, such as a decryption block 130, a bit detection block 140, a deinterleaving block 150 and a decoding block 160, which in this example realise the conventional decoding method for the transmitted data block used in GSM systems. Advantageously the functional blocks of FIG. 4 can be realised for instance as programs of a digital signal processor.

According to a preferred embodiment of the invention the mobile station operates in the following way. For instance, after the transmission of a transmission burst the control unit controls at the beginning of the measurement period the frequency synthesiser of the mobile station from the transmission frequency to the neighbouring cell frequency to be monitored, after which the control unit starts the A/D converter 90. The DSP unit 100, more particularly its buffer 105 or a corresponding memory unit, stores the data generated by the A/D converter during a certain predetermined period, for instance during one millisecond. This measurement data represents essentially the signal received by the mobile station's antenna at said frequency. From the stored data the DSP unit generates the RSSI and OTD measurement results, which the control unit of the mobile station typically uses to control the mobile station or to co-operate with the mobile communication network. Then the mobile station's control unit interrupts the operation of the A/D converter 90 and switches the frequency of the frequency synthesiser to the frequency required by the next operation, such as to the reception frequency of the own cell in order to receive the next burst.

The method to perform the RSSI and OTD measurements according to the invention gives the frequency synthesisers of the mobile station more time to switch frequency, whereby simpler frequency synthesisers can be used in the mobile station, which in turn decreases the manufacturing costs of the mobile station.

The method to perform the RSSI and OTD measurements according to the invention also reduces the power consumption of the mobile station. The measurement period, and at the sametime that period when the DSP block requires power in order to generate the measurement results, is shorter than in prior art solutions because the OTD and the RSSI measurements are made from the same data. Thus the invention conserves power, particularly regarding the DSP block.

On the other hand, the method according to the invention also makes it possible to use longer measurement periods for the RSSI and OTD measurements than in prior art. An extension of the measurement period is advantageous in that it provides more accurate measurement results.

The method to perform the RSSI and OTD measurements according to the invention is particularly well applicable to be used in mobile stations supporting the HSCSD system under development.

The invention is not limited to any particular method for generating RSSI and OTD measurement results or to any other analysis method of the collected measurement data, but the data collected by the DSP block 100 can be analysed with any of the known analysis methods for generating RSSI and OTD measurement results.

The invention is neither limited to performing only RSSI and OTD measurements, but the measurement method according to the invention can also be applied for making such measurements which can be implemented on the basis of data collected at the same frequency.

Above the invention was described with the aid of an example according to the GSM system, but the invention is in no way limited to be applied only to the GSM system. The invention can be implemented also in mobile stations of other cellular mobile communication systems which during a certain period of time must perform more than one measurement, at least some times. There may be also more separate measurements than the two measurements presented in the above examples.

Above the invention was described with reference to some of its preferred embodiments, but it is evident that the invention can be modified in many different ways in accordance with the inventive idea defined in the enclosed claims.

What is claimed is:

1. A method for performing measurements in a mobile station of a cellular mobile communications system, comprising steps in which:

data is collected at a certain frequency during a certain predetermined period, the collected data is analysed in order to generate a first measurement result, and the collected data is analyzed in order to generate a second measurement result, wherein said first measurement result and said second measurement result are obtained from different types of measurement, one of said types of measurement being a measurement of signal strength or a measurement of time.

2. A method according to claim 1, wherein said frequency is the transmission frequency of some adjacent base station.

3. A method according to claim 1, wherein said first measurement result is an RSSI measurement result.

4. A method according to claim 1, wherein said second measurement result is an OTD measurement result.

5. A mobile station comprising:

an RF block for the downconversion of a received signal, an A/D converter for converting the downconversion signal into a series of digital samples, and a signal processing block for processing the signal formed by the digital samples, comprising:

a memory means for storing a sample sequence with at least a certain predetermined length in time, a first signal processing block for generating a first measurement result on the basis of the sample sequence stored in said memory means, and a second signal processing block for generating a second measurement result on the basis of the sample sequence stored in said memory means, wherein said first measurement result and said second measurement result are obtained from different types of measurement, one of said types of measurement being a measurement of signal strength or a measurement of time.

6. A mobile station according to claim 5, wherein said first measurement result is an RSSI measurement result.

7. A mobile station according to claim 5, wherein said second measurement result is an OTD measurement result.

* * * * *